United States Patent [19]

Zbornik et al.

[11] 4,315,425

[45] Feb. 16, 1982

[54] CLAMPING DEVICE FOR FASTENING A TOOL TO A TOOL HOLDER

[75] Inventors: Vaclav Zbornik, Oftringen; Walter Gygli, Niederbipp, both of Switzerland

[73] Assignee: Haemmerle AG, Zofingen, Switzerland

[21] Appl. No.: 173,674

[22] Filed: Jul. 29, 1980

[30] Foreign Application Priority Data

Aug. 1, 1979 [AT] Austria .............................. 5286/79

[51] Int. Cl.³ .............................................. B21D 37/04
[52] U.S. Cl. ...................................... 72/481; 72/389; 72/462
[58] Field of Search ................ 72/481, 462, 389, 386, 72/475

[56] References Cited

U.S. PATENT DOCUMENTS

| | | | |
|---|---|---|---|
| 476,946 | 6/1892 | Leavitt | 72/481 |
| 1,386,891 | 8/1921 | Mayer | 72/481 |
| 3,209,576 | 10/1965 | Giordano | 72/389 |

FOREIGN PATENT DOCUMENTS

| | | | |
|---|---|---|---|
| 1046982 | 12/1958 | Fed. Rep. of Germany | 72/462 |
| 2427148 | 2/1980 | France | 72/481 |

Primary Examiner—Gene P. Crosby

[57] ABSTRACT

An easily releasable hydraulically pressurized clamping block assembly for attaching the bending tool to the ram of a folding press. A first clamping block having a recess to receive the tool abuts a bearing block at the rear thereof and is fitted with pins engaging in bores in the clamping block and in the bearing block while within the bearing block a longitudinal groove is provided which receives a hose which can be pressurized from a fluid pressure source through a control valve. Along the longitudinal groove between the above bores are holes which are fitted with springs which compress the hose pg,2 when in a non-pressurized state. A modification provides pins with widened heads. Another modification uses straight pins and an intermediate block within the groove to press against the hose. Still another modification provides a groove in the ram itself rather than in a separate block.

5 Claims, 6 Drawing Figures

CLAMPING DEVICE FOR FASTENING A TOOL TO A TOOL HOLDER

BACKGROUND OF THE INVENTION

1. Field of the Invention

This invention concerns a clamping device for fastening a tool to a tool holder, particularly for fastening a bending bar to a rammer of a folding press, comprising a clamping block assembly fitted with a hollow elastic elongated body which can be pressurised hydraulically or pneumatically to be thereby operable for clamping and unclamping and thereby quickly releasing the tool which is held by said body under hydraulic pressure by placing the assembly in a groove or cavity in the tool holder.

2. Description of the Prior Art

In the use of known clamping devices a clamping block is fastened to a spar of a press by means of fastening screws, bolts and nuts. When the fastening screws are loosened a groove in which the spar is located widens and thus releases the tool clamped therein, so that this can be taken out and replaced by another. These devices are robust and reliable, but against this have the disadvantage that the changing of tools is fairly time consuming and can be carried out only with the aid of other tools. Further, a quick clamping device has already been made known, with which hoses which can be inflated are used to operate the clamping device.

OBJECTS OF THE INVENTION

The present invention has as an object the provision of a clamping device with which the exchange of, for example, a bending bar, can be undertaken quickly and without the need for tools for the loosening of the clamping member, whereby a reliable release of the tool must be achieved when the hollow body is no longer pressurised. Furthermore, the clamping device of the invention is usable on existing machines without great alterations being necessary on the machines. It is also of importance that the tools which are often already present in great numbers should continue to be usable with the device in accordance with the invention.

SUMMARY OF THE INVENTION

With this object in view the present invention provides a clamping device for fastening a tool to a tool holder, particularly for fastening a bending bar to a rammer of a folding press, comprising a clamping member which by means of a hollow body which can be pressurised hydraulically or pneumatically is operable for releasably clamping the tool in a groove or cavity in the tool holder, characterised in that in the region of the hollow body a relieving member is present which exercises a constant force acting in opposition to the pressure of the clamp on the hollow body.

The clamping member preferably is a clamping block and is provided with through boreholes in which clamping pins are positioned displaceably therein. One end of each pin may abut the tool and its other end may abut an intermediate block which is supported against the hollow body.

Preferably, the clamping block is provided with a number of blind boreholes directed towards the hollow body and in each of which a pressure spring supported against the hollow body is received.

Advantageously, the hollow body is disposed in a chamber of the tool holder, which chamber has holding bolts inserted in connecting boreholes such that they abut the hollow body as well as on the bending tool. Finally, in accordance with a further preferable feature the hollow body can be disposed in an elastically pre-stressed sheet-cage which is partly open on one side, by means of which the tool is released when the hollow body is relaxed.

BRIEF DESCRIPTION OF THE DRAWING

The invention will be described further, by way of example, with reference to the accompanying drawings in which.

DESCRIPTION OF THE PREFERRED EMBODIMENTS

Figure 1:
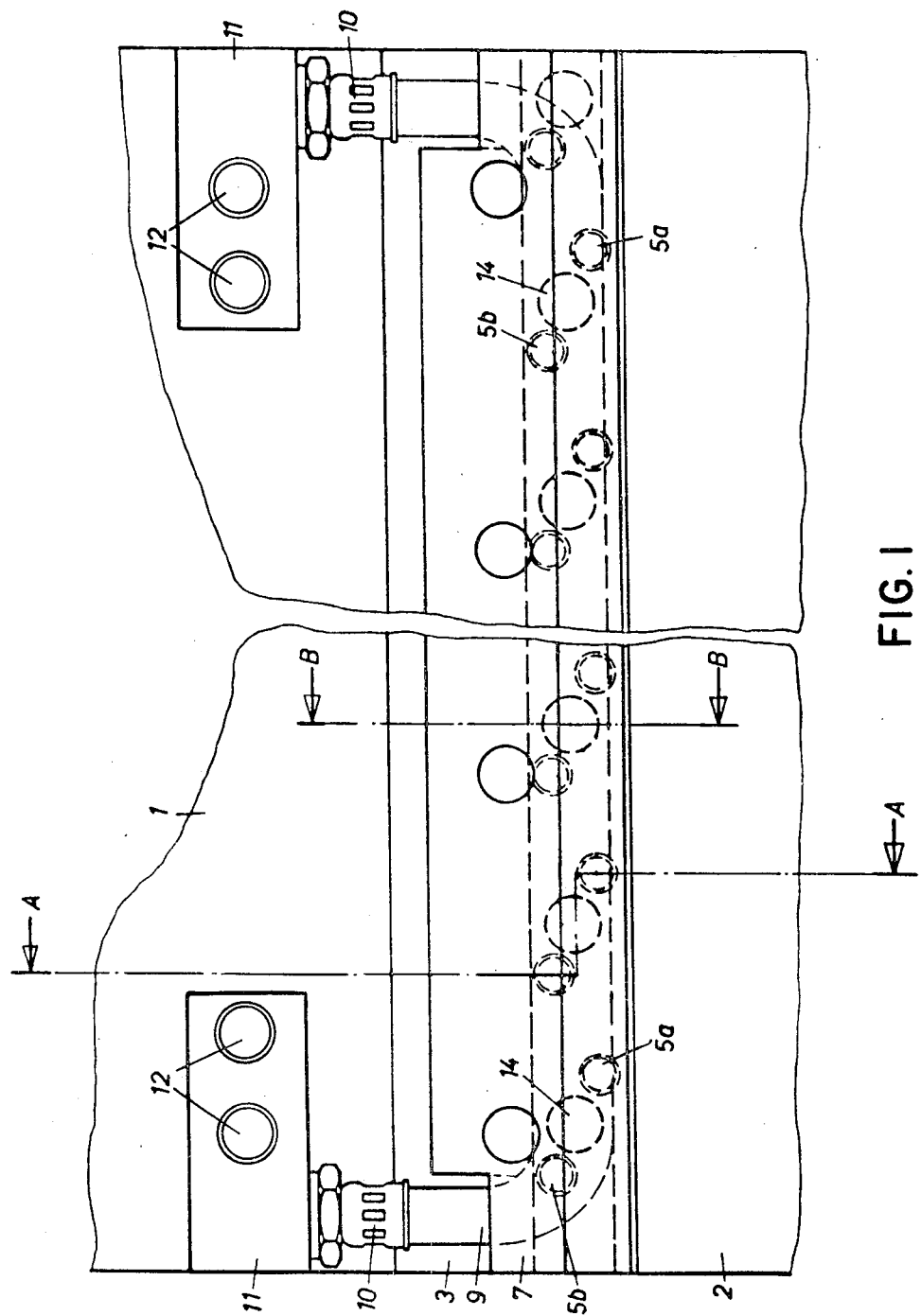
FIG. 1 is a front elevation of a first preferred embodiment of the clamping device of the invention.
Figure 2:
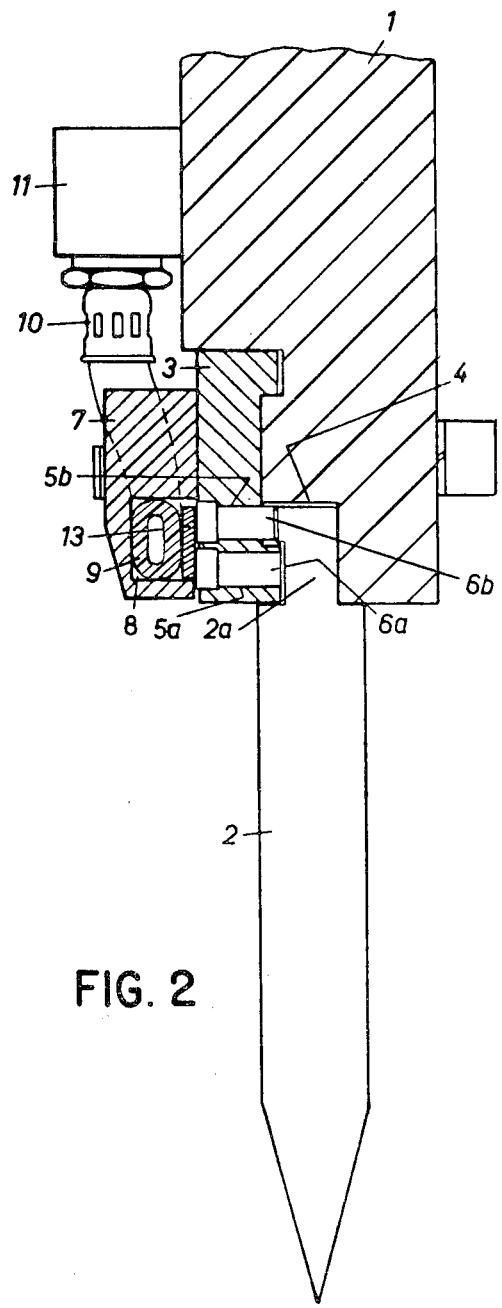
FIG. 2 is a cross-section along the line A—A of FIG. 1.
Figure 3:
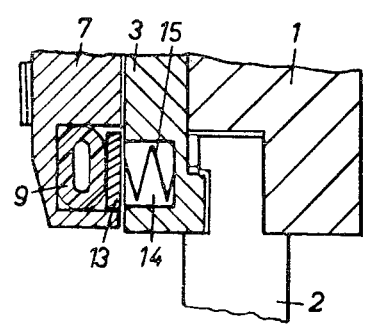
FIG. 3 is a cross-section along the line B—B of FIG. 1.

Referring to FIGS. 1 to 3, which illustrate a first preferred embodiment of the clamping device of the invention, lower part of a rammer 1 of a folding press to which is fastened a bending tool 2. Fastened to the lower end of the rammer 1, in a cavity, is a clamping block 3 which in its form and dimensions corresponds essentially to known clamping blocks. A groove 4 (see FIG. 2) is bounded by the lower part of the rammer 1 and the clamping block 3, and this groove 4 receives shaft 2a of the tool 2. The clamping block 3 has a number of pairs of through boreholes 5a and 5b in which clamping pins 6a and 6b are inserted. The boreholes 5a and 5b are in the lower part of the clamping block 3, which forms a side wall of the groove 4, and are arranged longitudinally along the groove in two rows one on each side of the groove. As can clearly be seen from FIG. 1 the boreholes 5a and 5b are displaced in relation to each other.

On its rear side the clamping block 3 has a bearing block 7 fastened thereto, which bearing block 7 has a groove 8 in the region of the clamping pins 6a and 6b, as shown in FIG. 2. The groove 8 receives a hose 9 which serves as a hollow body and which is connected to a source of fluid pressure metered through control valves 11 by means of its flanges 10 fitted on both its ends. The control valves 11 possesses connectors 12 to connect them to a source of pressure (not shown). Further the groove 8 receives an intermediate block 13 which is inserted between the front side of the pins 6a or 6b and the hose 9.

Between each pair of through boreholes 5a and 5b in the clamping block 3 there is provided a plurality of blind boreholes 14 which is open towards the hose 9. A spring 15 in each of the boreholes 14 is supported on the bottom of the blind boreholes and at the other end abuts the intermediate block 13, as shown in FIG. 3. Thus, the spring 15 forces itself against the hose 9 and compresses the hose 9 when said hose 9 is in a non-pressurized state.

Figure 4:
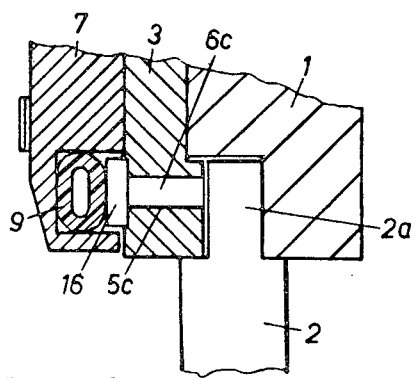
FIG. 4 is a cross-section through part of a second preferred embodiment of the clamping device of the invention.

FIG. 4 illustrates a second preferred embodiment of the clamping device in accordance with the invention. The clamping block 3 possesses only one row of boreholes 5c with pins 6c fitted displaceably therein. These possess heads 16, widening out on that side facing the hollow body or hose 9, corresponding approximately to the hose 9 in width, and are supported directly on the hose 9 without an intermediate block 13 being provided. Thus one must take into account a quicker wearing out of the hose 9 and a lesser stability in the fastening of the tool 2. However so long as the shaft 2a of the tool 2 is of sufficient length, this is not a disadvantage.

The operation of the clamping device is as follows. During the working of the press, the hose 9 is inflated with a pressurised medium by the operation of the valve 11. As the hose 9 inflates and expands it exercises a force against the shaft of the tool 2a on the pin 6, either via the intermediate block 13 (FIG. 2) or directly on the head 16 (FIG. 4).

If the tool is now to be exchanged, the valves 11 are switched over and the pressurised medium in the hose 9 is released. Under the effect of the spring 15 the hose 9 is now somewhat compressed, such that the pins 6a and 6b, or 6c are pushed back against the hose 9. The shaft 2a of the tool 2 thus becomes movable in the groove 4 and the tool 2 can be pulled out either to the side (FIG. 2) or downwards (FIG. 4). After the new tool has been inserted the hose 9 is again inflated with the pressurised medium and the pins 6a and 6b, or 6c press against the shaft 2a of the tool 2 and the tool 2 is securely fastened on the rammer 1.

Figure 5:
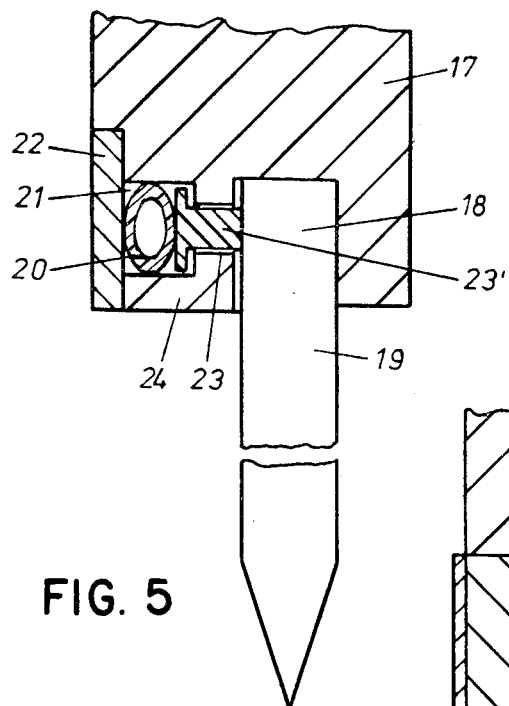
FIG. 5 is a cross-section through part of a further preferred embodiment of the clamping device of the invention.

A further, somewhat simplified, preferred embodiment of the clamping device is illustrated in FIG. 5. In this embodiment of the clamping device there is no clamping block such as clamping block 3. In rammer 17 which forms the tool holder, a groove is provided, in which an end 18 of a bending tool 19 is received. A hollow body in the form of a hose 20 is disposed in a chamber 21 of the rammer 17, which chamber 21 can be closed by a removable lid 22. Connecting boreholes 23 extend through the dividing wall 24 of the rammer 17, which divides a groove for the reception of the bending tool 19 from the chamber 21. Through the boreholes 23 extend holding bolts 23', which at one end abuts the hose 20 and at its other end abuts against the bending tool 19. Further, a retaining spring (not shown) is again present which, in a manner as described in relation to the previously discussed embodiments, tries to compress the hose 20 so long as this is in a pressure-less condition.

Figure 6:
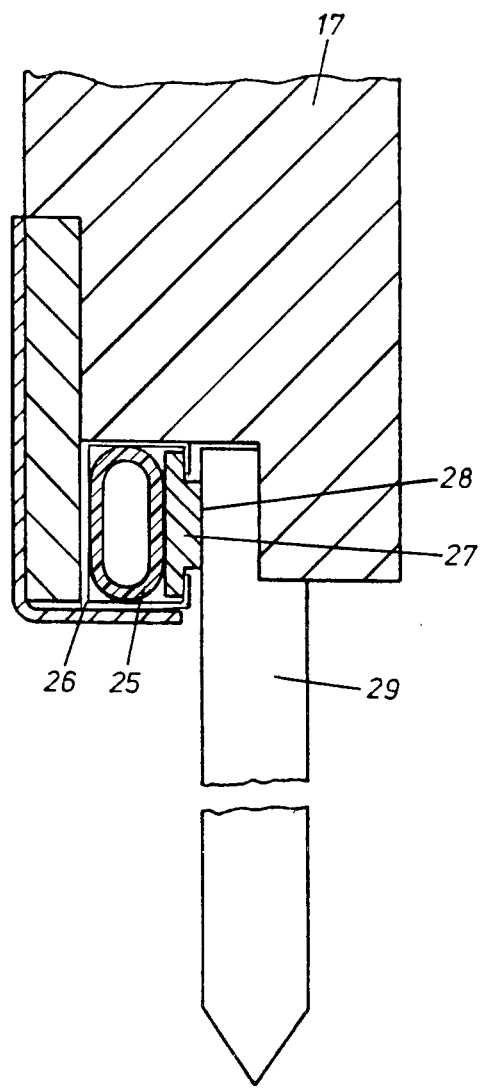
FIG. 6 is a cross-section through yet a further preferred embodiment of the clamping device of the invention.

In yet a further preferred embodiment of the clamping device of the invention as illustrated in FIG. 6, the hollow body or hose 25 is arranged in an elastic sheet-cage 26 of spring steel which is open on one side. An intermediate block 27 is inserted in the opening, which block 27 has a projecting rib 28 which stretches through the opening. The projecting rib 28 is pressed against the tool 29 and holds this fast. The sheet-cage 26 of spring steel is prestressed and when the pressure in the hose 25 is relieved draws the intermediate block 27 back, whereupon the tool 29 is released.

From the above it clearly emerges, that the clamping device of the invention is simple to operate for the fastening of a tool in a tool holder and possible an extremely quick and reliable exchange of tools. The device is simple in construction and therewith economical to produce and its robust construction guarantees a long, troublefree period of use. It should be possible without difficulty to equip machines which have already been long in use with the usual screw fastening, with the clamping device of the invention, since the shape and dimensions of the clamping block corresponds to known clamping blocks.

We claim:

1. A hydraulically pressurized block clamping assembly for receiving a bending tool and clamping the tool in a receiving groove of the ram of a folding press, said assembly comprising:
   a clamping block cooperating with the groove of the ram in which the tool is received;
   holes in said clamping block for receiving pins, one in each hole, to secure said ram to said tool by means of said block;
   said pins being arranged longitudinally along said groove in said ram;
   a bearing block fastened by pins to said clamping block;
   said bearing block having a receiving groove in the region of said longitudinally arranged pins of said clamping block;
   an elastic hose in said receiving groove of said bearing block adapted to be pressurized and bear against the tool to clamp it in the groove of said bearing block; and
   a pressure valve means for pressurizing said elastic hose and for venting the pressure whereby said tool may be released upon venting and is clamped upon pressurizing.

2. A clamping assembly as claimed in claim 1 including an intermediate block within said bearing block receiving groove with said pins at one end abutting said tool and at the end abutting said intermediate block.

3. A clamping assembly as claimed in claim 1 wherein said clamping block is provided with blind holes and pressure springs, one in each blind hole, to compress the hose when the pressure is released.

4. A clamping assembly for clamping a bending tool to the ram of a folding press comprising;
   a clamping block having a longitudinal groove fitted with a row of holes;
   displaceable pins in said holes;
   an elastic hose adapted to be pressurized by a fluid under pressure in said longitudinal groove;
   valve means to pressurize and vent said hose; and
   said pins having heads which are wider on the side of the groove next to said hose whereby said pins are displaced by pressure in said hose to press said tool against said ram in clamping position.

5. A hydraulically actuated means for securing a tool to the ram of a folding press comprising:
   a ram provided with a groove to receive a bending tool;
   an elastic hose in said groove of said ram;
   holes along said ram groove;
   displaceable bolts in said holes;
   an elastic hose in said groove; and
   valve means to pressurize said hose and push said bolts in clamping position to secure said tool to said ram.

* * * * *